No. 750,437. PATENTED JAN. 26, 1904.
A. C. DECKER.
HOG TAMER.
APPLICATION FILED OCT. 17, 1903.
NO MODEL. 2 SHEETS—SHEET 1.

Witnesses
Inventor:
Alexander C. Decker,
By Dodge and Sons,
Attorneys.

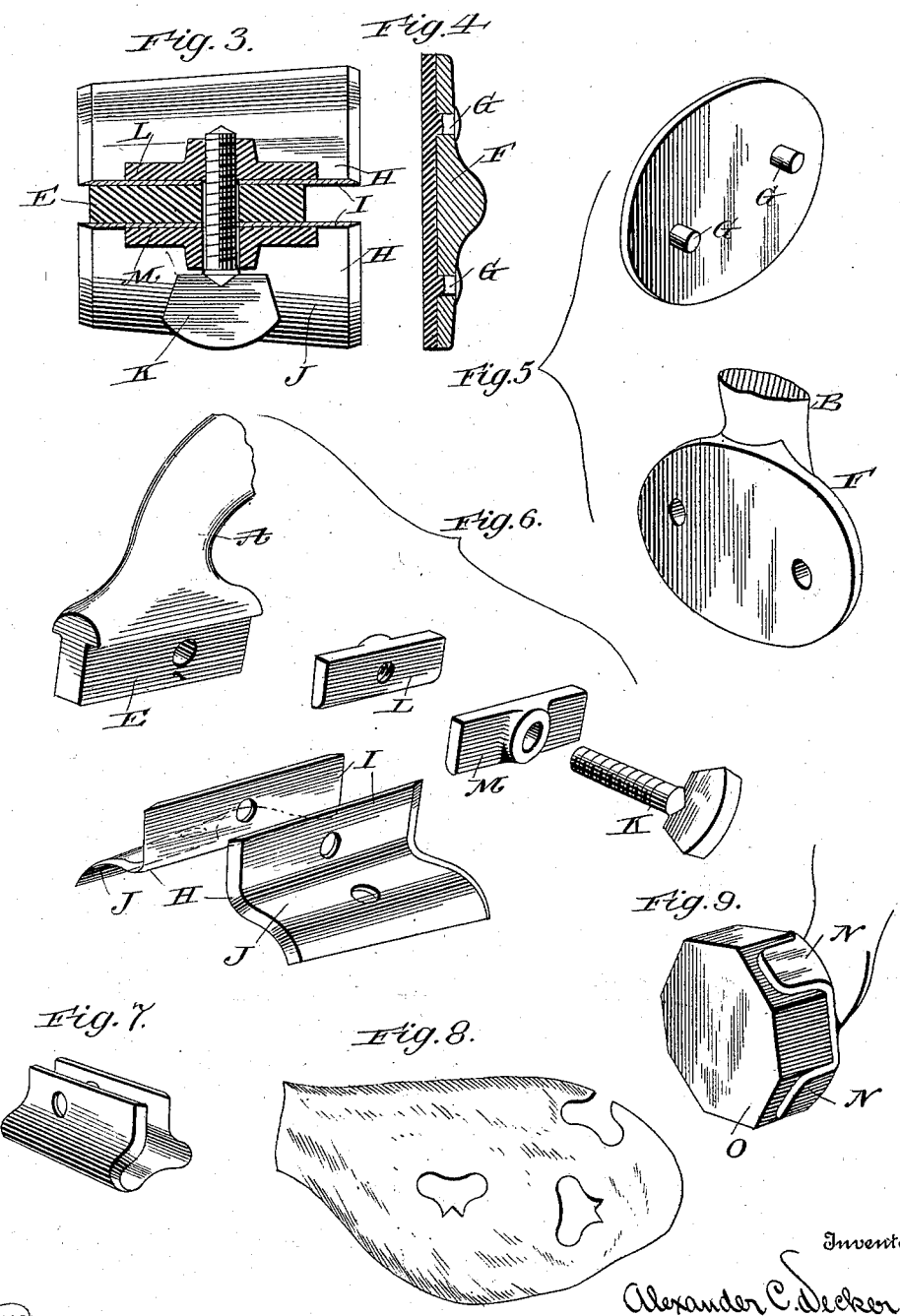

No. 750,437. Patented January 26, 1904.

UNITED STATES PATENT OFFICE.

ALEXANDER C. DECKER, OF KEOKUK, IOWA.

HOG-TAMER.

SPECIFICATION forming part of Letters Patent No. 750,437, dated January 26, 1904.

Application filed October 17, 1903. Serial No. 177,475. (No model.)

*To all whom it may concern:*

Be it known that I, ALEXANDER C. DECKER, a citizen of the United States, residing at Keokuk, in the county of Lee and State of Iowa, have invented certain new and useful Improvements in Hog-Tamers, of which the following is a specification.

My present invention relates to that class of instruments commonly known as "hog-tamers," and the improvement will be best understood upon reference to the annexed drawings, wherein—

Figure 1:
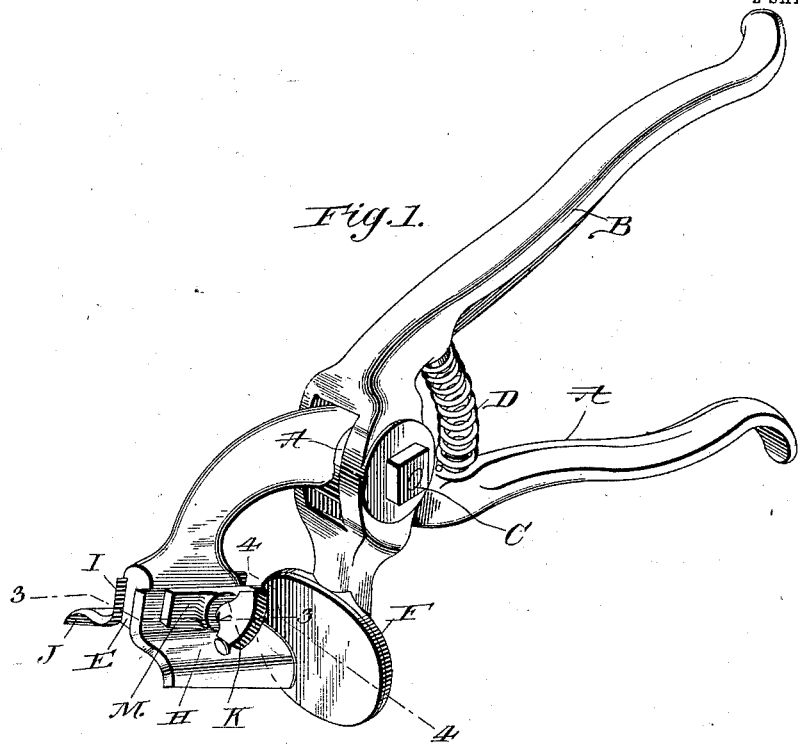
Figure 2:
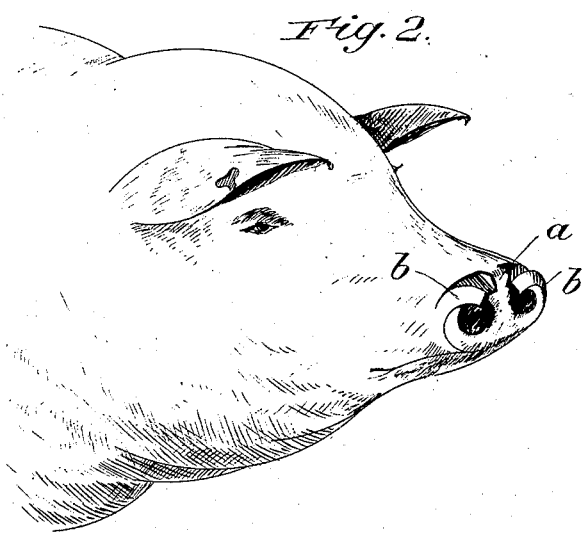

Figure 1 is a perspective view of the instrument; Fig. 2, a view of the head of a pig, showing the manner in which the instrument cuts the snout; Fig. 3, a sectional view on the line 3 3 of Fig. 1; Fig. 4, a similar view on the line 4 4 of Fig. 1; Fig. 5, a perspective view of the anvil or cutting-block and its support, the parts being shown as separated; Fig. 6, a perspective view of the cutter-blades and the attendant parts; Fig. 7, a perspective view of a separate cutter; Fig. 8, a view illustrating the manner in which a pig's ear may be marked with the cutter shown in Fig. 7, and Fig. 9 a perspective view of a modified form of anvil or cutting-block.

The primary object of the present invention is to provide an instrument which will cut the snout of a hog in such manner as to leave the nerve which extends down in the center thereof uninjured, while at the same time a lip or finger is formed at each side of the snout, which lips effectually prevent the animal from rooting to too great an extent.

A further object of the invention is to so construct the instrument that the cutting-blades may be changed, whereby it may be employed for various purposes—as, for instance, in marking the ears of swine for the purpose of identification.

Heretofore instruments have been employed for cutting the snout or nose of a hog; but so far as I am aware the incision or incisions made thereby have injured the nerve heretofore referred to, producing what is commonly known as "sniffles." The nerve in question extends into the nostrils and also to the eyes, and any injury thereto affects the general condition of the animal. With the present instrument and under my method this objection is entirely overcome.

Referring to the drawings, A and B represent two crossed handles or levers fulcrumed at C, with a spring D interposed between the handle portions proper to keep the same normally apart. The outer end of member A is provided with a flattened rib or member E, which stands approximately in alinement with the main body of the member and at a right angle to the outer end of member B or, more strictly speaking, to the anvil or cutting-block F, carried thereby. In the form shown in Figs. 1, 4, and 5 the anvil consists of a copper plate which is attached to member B, the means of attachment shown consisting of two depending lugs G, which pass through corresponding openings in said member.

Secured to the rib E are the cutters H. The cutting edge of each blade comprises a straight portion I and an outwardly and downwardly curved section J. The flat faces of the cutters lie against the side faces of the rib E and are secured in place by a thumb-screw K, which passes through a block M, both cutters, and the rib and into a second block L. These blocks, as will be seen, clamp the blades securely against the rib, thereby preventing them from shifting and insuring that the cutting edges shall always come squarely upon the anvil when the handles are brought together. Both ends of the blades are sharpened, and one end is made wider than the other, as will be clearly seen upon reference to Fig. 6. The blades are thus reversible and may be changed according to the size of the animal being operated upon.

The manner in which the instrument is to be used is obvious. The anvil is placed against the flat forward portion of the snout, while the blades are forced quickly through the nose, the straight cutting edges of the blades, which are separated by the thickness of the rib E, passing down to each side of the central portion of the nose, leaving a projection *a*, while the curved sections, which conform to the general outline of the snout, cut downwardly and outwardly, forming lips or fingers *b*.

In Fig. 7 I have shown a one-piece blade, which may be attached to rib E in place of the cutters heretofore described and is intended to be employed in marking the ear of the pig or other animal for the purpose of identification, as indicated in Fig. 8. Any other form of blade may of course be employed for this purpose.

In Fig. 9 a modified form of anvil is illustrated. The lever or handle member is provided with a series of fingers or lugs N, which embrace a block O of wood or equivalent material.

It is of course manifest that the invention is not limited to the particular or exact form of cutter shown for forming the fingers, as any other cutter which will secure this result and at the same time leave the central portion of the nose uninjured falls within my invention.

No claim is made in this case to the method of cutting the snout herein set forth, that matter being reserved for a separate application.

Having thus described my invention, what I claim, and desire to secure by Letters Patent, is—

1. In an instrument of the character specified, a pair of cutters, each having a straight and a curved portion, the latter having the general contour of a hog's snout, the straight portions when in use passing down through the nose of a hog to each side of the center thereof while the curved portions pass through the edge or rim of the snout and form fingers at each side of said center.

2. In an instrument of the character specified, the combination of an anvil; and a pair of cutters, said cutters being separated from each other and having their adjacent edges arranged at approximately right angles to the remaining portions of the cutters, which latter portions take the general contour of a hog's snout, substantially as described.

3. In an instrument of the character specified, the combination of a pair of pivoted levers or handles; an anvil carried by one of said members; and a pair of cutters carried by the second member, said cutters taking the general form of a pig's nose or snout throughout the major portion of their cutting edges and being separated at their adjacent faces, said faces extending outwardly at an angle to the main cutting-line, whereby when the cutters are brought down on the anvil, fingers, one at each side of the center of the hog's nose, will be formed, while said center will remain undisturbed and uninjured.

4. In an instrument of the character specified, the combination of a pair of pivoted levers or handles; an anvil carried by one of said members; and a pair of cutters carried by the second member, said cutters taking the general form of a pig's snout or nose throughout the major portion of their cutting edges, and being separated at their adjacent faces, said faces extending outwardly in approximate parallelism to each other and at substantially right angles to the main cutting-line, whereby fingers will be formed, one at each side of the center of the hog's nose, while said center will remain uninjured.

5. In an instrument of the character specified, the combination of a pair of pivoted levers or handles; an anvil carried by one of said members; and a pair of cutters removably secured to the second member, each of said cutters being sharpened at both ends and having one end wider than the other, whereby the cutters may be reversed and the aggregate length of the cutting edge varied as desired.

6. In an instrument of the character specified, the combination of a pair of pivoted levers or handles; an anvil carried by one of said members; and a pairs of cutters removably secured to said second member, each of said cutters being sharpened at both ends and having a straight and a curved portion, the curved portion being longer at one end than at the other.

7. In an instrument of the character specified, the combination of a pair of pivoted levers or handles; an anvil carried by one of said members; a rib E formed upon the outer end of the opposite member; a cutter embracing the rib upon its opposite faces; and means for detachably securing said cutter to the rib, whereby cutters of different forms may be employed, substantially as described.

8. In an instrument of the character specified, the combination of a pair of pivoted levers or handles; a copper anvil carried by one of said members; a rib E formed upon the outer end of the opposite members; reversible cutters, each having a straight and a curved portion, substantially as described; blocks bearing against the outer faces of said straight portions of the cutters and holding them against the rib; and a screw passing through said blocks, cutters and rib, whereby the parts are secured in position, substantially as described.

In testimony whereof I have signed my name to this specification in the presence of two subscribing witnesses.

ALEXANDER C. DECKER.

Witnesses:
A. L. PARSONS,
J. F. SMITH.